Nov. 28, 1933.  G. H. CURTISS  1,937,055
SEAT
Filed March 8, 1929

INVENTOR
GLENN H. CURTISS.
BY
ATTORNEY

Patented Nov. 28, 1933

1,937,055

UNITED STATES PATENT OFFICE 1,937,055

SEAT

Glenn H. Curtiss, Country Club Estates, Fla., assignor, by mesne assignments, to Curtiss Aerocar Company, Inc., Opa Locka, Fla., a corporation of Florida Application March 8, 1929. Serial No. 345,284

3 Claims. (Cl. 155—9)

My invention relates to seats.

A characteristic of the invention is the interposition of rubber or other yielding non-metallic material between the seat per se and that part or portion of the seat structure constituting the seat support.

A further characteristic of the invention is the provision of a simple and inexpensive form of mounting within which the rubber or other non-metallic parts of the seat are retained.

A still further object of the invention is to provide a rugged tho comfortable type chair seat especially designed as vehicle equipment, and one which completely absorbs and dissipates all ordinary shocks and jolts occurring in vehicular travel.

Other objects, advantages and characteristics of the invention will be hereinafter pointed out.

In the drawing, wherein like reference characters denote like or corresponding parts, Fig. 1 is a front elevation of the seat;

Figure 1:
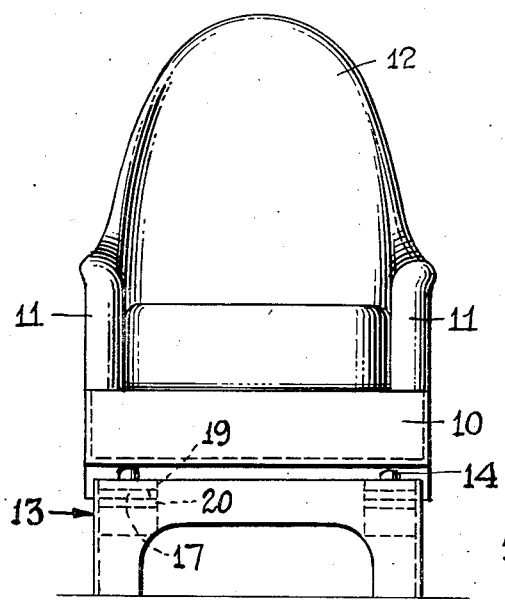
Figure 2:
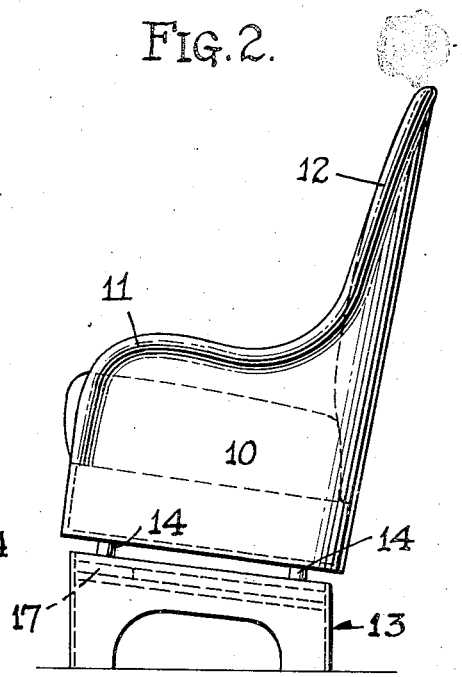
Fig. 2 is a side elevation.

In the embodiment of the invention selected for illustration a well upholstered chair type seat is shown. Such seat comprises the usual seat part 10, arms 11—11 and combined head and back-rest 12. The seat supporting frame, designated as 13, is preferably rectangular. Viewed from the side (see Fig. 2) said seat supporting part 13 is inclined from front to back and has mounted thereon, one at each of the respective four corners thereof, four upstanding spacers 14. These spacers 14, yieldingly supported, are preferably of equal length, and in each instance, are of sufficient length to support the seat part 10 in spaced relation to the seat supporting part 13. As herein shown, each said spacer 14 is centrally bored as at 15 to receive therein a retaining bolt 16. Said bolts 16, at their upper ends, are let thru the seat frame, and at their opposite ends are let thru rubber discs 17 by means of which the seat part 10 is yieldingly supported. Nuts 18, threaded on the lower ends of the bolts 16, and bearing on the under side of said disc 17, act to hold said bolts in place.

Figure 3:
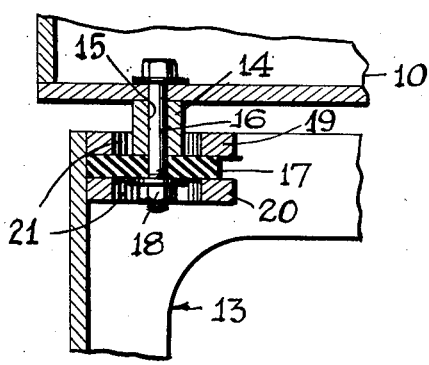
Fig. 3 is an enlarged transverse vertical sectional view of one of the rubber retaining mounts.
Figure 4:
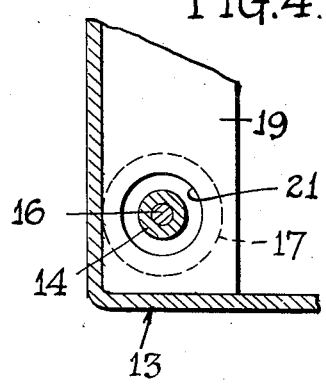
Fig. 4 is a plan view of a portion of the underneath or seat supporting part of the seat.

The rubber discs, one for each bolt, are fastened to the seat supporting frame by suitably spaced clamping or retaining blocks 19—20. These blocks (see Fig. 4), of which there are two sets, one for each pair of discs, extend from one end to the other of said frame along its opposite sides. Each said block has formed therein two openings 21 thru which the retaining bolts 16 extend. Said openings, (see Fig. 3), like the discs 17, are preferably circular and larger in diameter than the spacers 14, tho smaller in diameter than said discs. Accordingly, at each of the respective four corners of said supporting frame a vertical passageway is provided in which the spacers 14, and hence the bolts 16, are free to work up and down. As such vertical movement of said bolts is at all times yieldingly restrained by the rubber discs 17, obviously all vibration and/or other shocks which would otherwise be directly transmitted to the seat part 10, are adequately and completely absorbed by said rubber discs.

A chair type seat constructed as herein set forth is especially suited to installation in vehicular structures such as busses, trailers, semi-trailers, railway coaches, etc. It is strong, comfortable, and at the same time inexpensive to manufacture and simple in design. By varying the size of the discs 17 and of the openings 21, the degree of flexibility accorded the seat 10 may be varied. Also, by increasing the angle of inclination of the seat or seat bottom and of the frame top, a chair or seat having a greater degree of backward inclination may be provided. Regardless of inclination, it is immaterial from the standpoint of operativeness, whether or not the retaining bolts 16 act up or down on the rubber discs. The shock absorbers, in either or both positions of adjustment, function the same.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a seat, a fixed seat part, a relatively movable seat part, non-metallic disc-like shock absorbing devices mounted on one said seat part, means carried by said seat part to clamp said shock absorbing devices in place, spacers bearing at one end on said shock absorbing devices and bearing at their opposite ends on the other said seat part, and means fastened to said last mentioned seat part and penetrating said spacers and said shock absorbing devices for binding the seat parts together.

2. In an article of furniture, a supporting frame, a plurality of annular non-metallic shock absorbing devices secured to said supporting frame, a bolt for each shock absorbing device passing through the hole in said device, a sleeve surrounding each said bolt and contacting with and supported by said shock absorbing device, a seat contacting with and supported by said sleeves, the seat being provided with a hole for each bolt and each bolt passing through said hole, and a nut for holding said bolt within the holes in the seat and the shock absorbing device.

3. In an article of furniture, a supporting frame, a pair of shelves secured to said frame, the said shelves having aligned holes, a yielding non-metallic shock absorbing device positioned between said shelves, said device also having a hole passing therethrough and aligned with the holes in the shelves, a relatively movable seat, and means passing through said holes and engaging said shock absorbing device for yieldingly supporting said seat upon said frame.

GLENN H. CURTISS.